United States Patent [19]

Frye et al.

[11] 4,071,498

[45] Jan. 31, 1978

[54] METHOD OF CHAIN EXTENDING ORGANOSILOXANES

[75] Inventors: Cecil L. Frye, Midland; Jerome M. Klosowski, Monitor Township, Bay County, both of Mich.

[73] Assignee: Dow Corning Corporation, Midland, Mich.

[21] Appl. No.: 644,380

[22] Filed: Dec. 29, 1975

[51] Int. Cl.² ............................................. C08G 77/04
[52] U.S. Cl. ........................ 260/46.5 G; 260/46.5 E; 260/46.5 UA; 260/448.2 Q
[58] Field of Search ................ 260/46.5 E, 46.5 G, 260/46.5 UA, 448.2 Q

[56] References Cited

U.S. PATENT DOCUMENTS

| | | | |
|---|---|---|---|
| 3,364,160 | 1/1968 | Golitz et al. | 260/46.5 G |
| 3,378,520 | 4/1968 | Sattlegger et al. | 260/46.5 G |
| 3,417,047 | 12/1968 | Golitz et al. | 260/46.5 E |
| 3,766,127 | 10/1973 | Clark et al. | 260/46.5 E |
| 3,766,128 | 10/1973 | Brady et al. | 260/46.5 E |
| 3,766,934 | 12/1973 | Toporcer | 260/46.5 G |

*Primary Examiner*—Melvyn I. Marquis
*Attorney, Agent, or Firm*—Roger H. Borrousch

[57] ABSTRACT

Mixing methylvinyldi-(epsilon-caprolactamo)silane with an organosiloxane having silicon-bonded hydroxyl radicals increases the molecular weight by chain extension. This method is particularly useful in making high molecular weight polydiorganosiloxanes containing vinyl radicals from hydroxyl endblocked polydiorganosiloxane fluids.

3 Claims, No Drawings

METHOD OF CHAIN EXTENDING ORGANOSILOXANES

BACKGROUND OF THE INVENTION

1. Field of the Invention

This invention relates to a method of chain extending organosiloxanes.

2. Description of the Prior Art

The methylvinyldi-(epsilon-caprolactamo)silane is known from an article by K. A. Andrianov et al., entitled "Reaction of Alkyl(aryl)chlorosilanes and Alpha,omega-dichloromethylsiloxanes With Epsilon-caprolactam and Alpha-pyrrolidone", in Izvestiya Akademii Nauk SSSR, Seriya Khimicheskaya, No. 5, pp. 1150–1152, May, 1972; CB Trans, pp. 1100–1102.

A number of silanes have been known to chain extend hydroxyl endblocked polydiorganosiloxanes. Such a silane is methylvinyldi-(N-methylacetamido)silane which is described as an in situ chain extender in low modulus room temperature vulcanizable silicone elastomer compositions. This is described by Toporcer et al. in U.S. Pat. No. 3,776,934. An application by I. D. Crossan and L. H. Toporcer, Ser. No. 596,475, filed July 16, 1975 and entitled "Method of Increasing the Molecular Weight of Hydroxyl Endblocked Polydiorganosiloxanes" and now U.S. Pat. No. 4,020,044 describes using certain methylvinyldi-(N-organoacetamido)silanes to chain extend hydroxyl endblocked polydiorganosiloxanes by mixing the two components.

Not all dihydrolyzable silanes will act as chain extenders for hydroxyl endblocked polydiorganosiloxanes. Whereas some such silanes are known, there is still room for improved methods of chain extending, such as faster at room temperature, non-reactive by-products, non-toxic by-products, odorless by-products, high yield of product, clean reactions and the like.

SUMMARY OF THE INVENTION

By mixing organosiloxanes with silicon-bonded hydroxyl radicals with methylvinyldi-(epsilon-caprolactamo)silane, the molecular weight of the organosiloxane is increased and the newly formed organosiloxane contains vinyl radicals which are useful for further reaction, such as, with vinyl specific peroxides or with a combination of siloxane compounds containing silicon-bonded hydrogen atoms and a platinum catalyst to make cured products.

DESCRIPTION OF THE INVENTION

This invention relates to a method of increasing the molecular weight of an organosiloxane having silicon-bonded hydroxyl radicals comprising mixing the organosiloxane wherein the organic groups are monovalent hydrocarbon radicals or monovalent halogenated hydrocarbon radicals and there is an average of at least one hydroxyl radical per molecule and methylvinyldi-(epsilon-caprolactamo)silane, thereafter recovering a product organosiloxane having a molecular weight higher than the organosiloxane mixed with the silane and having methylvinylsiloxane units in the product organosiloxane.

The organosiloxanes are those which contain at least one silicon-bonded hydroxyl per molecule and the organic groups are monovalent hydrocarbon radicals or monovalent halogenated hydrocarbon radicals. These organosiloxanes can be homopolymers, copolymers, and mixtures of polymers. The organosiloxanes can be made up of siloxane units, such as, monoorganosiloxane units, diorganosiloxane units, $SiO_2$ units and triorganosiloxane units, as long as there is one silicon-bonded hydroxyl radical per molecule. These organosiloxanes are preferably hydroxyl endblocked polydiorganosiloxanes wherein the preferred organic group is methyl radicals. The monovalent hydrocarbon radicals can be methyl, ethyl, hexyl, octadecyl, vinyl, allyl, cyclohexyl, cyclohexenyl, phenyl and the like. The monovalent halogenated hydrocarbon radicals can be 3,3,3-trifluoropropyl, chloropropyl,alpha,alpha,alpha-trifluorotolyl, chlorobenzyl, bromobutyl and the like. Other than methyl, the preferred organic groups are phenyl and 3,3,3-trifluoropropyl.

The methylvinyldi-(epsilon-caprolactamo)silane can be prepared by mixing at room temperature under substantially anhydrous conditions, methylvinyldichlorosilane, epsilon-caprolactam, triethylamine and toluene. The methylvinyldi-(epsilon-caprolactamo)silane produced can be recovered by filtering to remove the by-produced triethylamine-hydrogen chloride and vacuum distilling the filtrate to remove the toluene and to further purify the silane by distillation.

By mixing the organosiloxane with the silane, a new organosiloxane of higher molecular wweight is obtained. This mixture of organosiloxane and silane reacts very rapidly and the reaction goes to completion at room temperature in a short period of time ranging from a few minutes to a few hours depending upon the nature of the organosiloxane. The mixtures are reacted neat and do not require a solvent, but, if desirable, an organic solvent could be used. However, for most uses of the organosiloxane product, solvents are not used, therefore, it is more desirable to mix the ingredients neat to avoid the waste of energy and time to remove the solvent.

The amount of silane used will depend upon the desired molecular weight of the final product and the amount of vinyl radical one wishes in the final product. To make gum consistency polydiorganosiloxanes, one preferably uses sufficient silane to provide approximately one epsilon-caprolactamo group per silicon-bonded hydroxyl of a hydroxyl endblocked polydiorganosiloxane. Smaller amounts of silane than this in the reaction mixture provide less increase in molecular weight. Larger amounts of silane will provide larger amounts of vinyl in the final organosiloxane and also require the presence of moisture (water) to cause the increased molecular weight.

The advantages of this method are, the reaction takes place at room temperature and gum consistency products can be obtained from low molecular weight hydroxyl endblocked polydiorganosiloxanes without heating and without solvent in relatively short times. Inasmuch as the silane becomes a part of the polydiorganosiloxane product and the silane contains a vinyl group, this method produces a special class of polydiorganosiloxanes which have vinyl groups attached to silicon atoms distributed along the polymer chain at intervals determined by the molecular weight of the starting polydiorganosiloxane. The vinyl groups in the product organosiloxane are particularly useful as sites for further reaction. In the product polydiorganosiloxane, the vinyl groups are useful as crosslinking sites to produce elastomers, gels and resinous products, depending upon the amount of vinyl and the molecular weight of the starting polydiorganosiloxane. The crosslinking can be readily accomplished by organic peroxides, a special class being the vinyl specific organic peroxides or through reaction with compounds contains silicon-bonded hydrogen atoms in the presence of a platinum catalyst. Also the vinyl containing polydiorganosiloxanes can be used, to make new polydiorganosiloxanes by reacting the vinyl group with a silicon-bonded hydrogen atom and thereby attaching new groups or functionality.

Other diorganolactamosilanes investigated were either very slow or did not chain extend at all, while epsilon-caprolactamosilanes with other than methyl and vinyl groups on silicon were much slower to make gum consistency products from hydroxyl endblocked polydimethylsiloxane fluids at room temperature.

The following example is presented for illustrative purposes only and should not be construed as limiting the present invention which is properly delineated in the claims.

EXAMPLE

In a one liter, 3-necked flask equipped with a stirrer, Dean Stark trap and condenser, 95 g. of epsilon-caprolactam, 101 g. of triethylamine and 600 ml. of toluene was placed and the mixture was azeotroped to remove the water which was collected in the trap and removed. Using an addition funnel, 56.4 g. of methylvinyldichlorosilane was added to the dried mixture after it had cooled to room temperature. The addition took approximately 10 minutes. After the addition of the silane, the mixture was then stirred for 2.5 hours. The resulting mixture was filtered under a nitrogen atmosphere to remove the triethylamine-hydrogen chloride by-product. The filter cake was washed with 200 ml. of dry toluene. The filtrate and wash were vacuum stripped to remove the toluene and 119.5 g. material was recovered. This material was a crude methylvinyl-di-(epsilon-caprolactam)silane containing some unreacted epsilon-caprolactam. This product was neutral to pH paper when hydrolyzed and a mixture of 0.37 g. silane with 10 g. of a hydroxyl endblocked polydimethylsiloxane having a viscosity at 25° C. of 4.5 Pa·s skinned over in 10 to 15 minutes. The crude silane product was then vacuum distilled using a 10-inch vigreux column. The product collected was methylvinyldi-(epsiloncaprolactamo)silane which had a boiling point of 160° C at 133.3 Pa. The structure of the silane was confirmed by infrared analysis and nuclear magnetic resonance analysis. A mixture of 0.35 g. of distilled silane with 10 g. of the hydroxyl endblocked polydimethylsiloxane defined above skinned over in the same time range. A mixture of the silane and the hydroxyl endblocked polydimethylsiloxane was prepared using amounts to provide about one epsilon-caprolactamo group per silicon-bonded hydroxy and the viscosity was followed. After 5 minutes, the viscosity of the mixture increased to about 10 Pa·s; after 10 minutes the viscosity of the mixture had increased to about 110 Pa·s and after 25 minutes the viscosity of the mixture had reached about 700 Pa·s.

That which is claimed is:

1. A method of increasing the molecular weight of a hydroxyl endblocked polydiorganosiloxane having silicon-bonded hydroxyl radicals consisting essentially of mixing the polydiorganosiloxane wherein the organic groups are monovalent hydrocarbon radicals or monovalent halogenated hydrocarbon radicals and methylvinyldi-(epsiloncaprolactamo)silane, thereafter recovering a product polydiorganosiloxane having a molecular weight higher than the polydiorganosiloxane mixed with the silane and having methylvinylsiloxane units in the product polydiorganosiloxane.

2. The method in accordance with claim 1 in which the organic groups of the polydiorganosiloxane are methyl radicals.

3. The method in accordance with claim 2 in which the polydiorganosiloxane recovered in a gum consistency polydiorganosiloxane.

* * * * *

UNITED STATES PATENT AND TRADEMARK OFFICE
CERTIFICATE OF CORRECTION

PATENT NO. : 4,071,498
DATED : January 31, 1978
INVENTOR(S) : Cecil L. Frye and Jerome M. Klosowski It is certified that error appears in the above-identified patent and that said Letters Patent are hereby corrected as shown below:

Column 2, line 25: the phrase "molecular wweight" should read "molecular weight"

Column 3, line 2: the word "contains" should read "containing"

Column 4, line 28: the word "(epsiloncaprolactamo)" should read "(epsilon-caprolactamo)"

Column 4, line 37: the word "in" should read "is"

Signed and Sealed this

Thirtieth Day of March 1982

[SEAL]

Attest:

Attesting Officer

GERALD J. MOSSINGHOFF
*Commissioner of Patents and Trademarks*